US006578057B1

(12) United States Patent
Hori

(10) Patent No.: US 6,578,057 B1
(45) Date of Patent: Jun. 10, 2003

(54) METHOD OF AND APPARATUS FOR DERIVING PRIME NUMBERS, AS WELL AS RECORD MEDIUM HAVING PROGRAM FOR EXECUTING PRIME NUMBER DERIVING METHOD RECORDED THEREON

(76) Inventor: Hironobu Hori, 3-608 Puromunado Kitamatsudo, 117-7 Shinzaku, Matsudo-shi, Chiba-ken (JP)

( * ) Notice: Subject to any disclaimer, the term of this patent is extended or adjusted under 35 U.S.C. 154(b) by 0 days.

(21) Appl. No.: 09/392,779

(22) Filed: Sep. 9, 1999

(30) Foreign Application Priority Data

Oct. 16, 1998 (JP) ............................................ 10-295757

(51) Int. Cl.$^7$ ............................... G06F 7/00; H04L 9/00
(52) U.S. Cl. ......................... 708/200; 708/270; 380/28; 380/44
(58) Field of Search ................................ 708/200, 270; 380/28, 29, 30, 44

(56) References Cited

U.S. PATENT DOCUMENTS

| 4,351,982 A | * | 9/1982 | Miller et al. ................... 380/30 |
| 6,307,938 B1 | * | 10/2001 | Matyas, Jr. et al. ........... 380/44 |
| 6,330,332 B1 | * | 12/2001 | Itoh et al. ...................... 380/28 |

* cited by examiner

Primary Examiner—Chuong Dinh Ngo
(74) Attorney, Agent, or Firm—Sughrue Mion, PLLC

(57) ABSTRACT

On the basis of a high degree of theory, prime numbers are derived through effective processing and steps so as to achieve a remarkable reduction in the processing time taken for the derivation. With respect to an arbitrary prime number rank entered, (1) numerical values are added in sequence to a prime number of the anterior rank to calculate prime number candidates of the next rank; (2) the thus calculated prime number candidate is divided by known prime numbers to verify whether it is a prime number or not; and (3) processing for reducing the verification time is iterated when the thus calculated prime number candidate is larger than a certain value, to thereby derive prime numbers until the entered rank is reached.

19 Claims, 5 Drawing Sheets

FIG. 3

```
100  DEFSGN A:DEFSGN X
101  INPUT "A(N)=";N
102  INPUT "X(C)=";C
104  OPTION BASE 0
105  DIM A(N),X(C)
106  OPEN "C:DATA1.DAT" AS #1
107  FIELD #1,10 AS I$,20 AS A$,40 AS X$
110  K=3:C=210:D=30
120  FOR V=0 TO 46
130  READ A(V)
140  DATA 1,2,3,5,7,11,13,17,19,23,29,31,37,41,43,47,53,59,61,
     67,71,73,79,83,89,97,101,103,107,109,113,127,131,137,139,
     149,151,157,163,167,173,179,181,191,193,197,199
150  IF V=0 THEN 170 ELSE 160
160  PRINT USING "########";V,A(V);
170  NEXT V
200  GOTO 280
210  K=K+1
220  X(0)=A(0)
230  FOR H=1 TO K
240  X(H)=X(H-1)*A(H)
250  NEXT H
260  D=X(K-1):C=X(K)
270  GOTO 320
280  FOR I=47 TO N
290  LET S=A(I-1):G=(S-1)/2
300  FOR J=1 TO G
310  A(I)=S+2*J
320  IF A(I)<C THEN 330 ELSE 210
330  R=A(I)-D:IF R=1 THEN 400 ELSE 340
340  IF A(K-1)<R THEN 350 ELSE 900
350  FOR T=1 TO K-1
360  IF R/A(T)-FIX(R/A(T))=0 THEN 900 ELSE 370
370  NEXT T
400  IF R=1 THEN W=2 ELSE W=K
500  Y=SQR(A(I)):Y1=FIX(Y)
510  FOR U=2 TO N-1
520  IF Y1-A(U)>=0 THEN 530 ELSE 540
530  NEXT U
540  LET Z=U+1
550  FOR L=W TO Z
560  IF L=Z THEN 910 ELSE 570
570  PN=A(I):PL=A(L):F1=FIX(PN/PL):F2=PN/PL
580  IF F2-F1=0 THEN 900 ELSE 590
590  NEXT L
900  NEXT J
910  PRINT USING "########";I,A(I);
920  NEXT I
930  CLOSE #1
940  END
```

FIG. 5

```
run
A(N)=? 60
X(C)=? 10
```

|     |     |     |     |     |     |     |     |     |     |
|----:|----:|----:|----:|----:|----:|----:|----:|----:|----:|
|   1 |   2 |   2 |   3 |   3 |   5 |   4 |   7 |   5 |  11 |
|   6 |  13 |   7 |  17 |   8 |  19 |   9 |  23 |  10 |  29 |
|  11 |  31 |  12 |  37 |  13 |  41 |  14 |  43 |  15 |  47 |
|  16 |  53 |  17 |  59 |  18 |  61 |  19 |  67 |  20 |  71 |
|  21 |  73 |  22 |  79 |  23 |  83 |  24 |  89 |  25 |  97 |
|  26 | 101 |  27 | 103 |  28 | 107 |  29 | 109 |  30 | 113 |
|  31 | 127 |  32 | 131 |  33 | 137 |  34 | 139 |  35 | 149 |
|  36 | 151 |  37 | 157 |  38 | 163 |  39 | 167 |  40 | 173 |
|  41 | 179 |  42 | 181 |  43 | 191 |  44 | 193 |  45 | 197 |
|  46 | 199 |  47 | 211 |  48 | 223 |  49 | 227 |  50 | 229 |
|  51 | 233 |  52 | 239 |  53 | 241 |  54 | 251 |  55 | 257 |
|  56 | 263 |  57 | 269 |  58 | 271 |  59 | 277 |  60 | 281 |

METHOD OF AND APPARATUS FOR DERIVING PRIME NUMBERS, AS WELL AS RECORD MEDIUM HAVING PROGRAM FOR EXECUTING PRIME NUMBER DERIVING METHOD RECORDED THEREON

BACKGROUND OF THE INVENTION

1. Field of the Invention

The present invention relates to prime number deriving method and apparatus allowing derivation of prime numbers of arbitrary ranks.

2. Description of the Related Art

It is an extremely difficult work from theoretical and arithmetic viewpoints to exclusively select only prime numbers with definite ranks from a group of numbers having a diversity of properties, which will require processing of electronic computers. Nevertheless, by virtue of the difficulty of selection, the prime numbers are often used in beneficial processes in the industrial fields, including use as ciphers for message authentication, user validation, etc.

For this reason, various prime number deriving methods and verifying methods have hitherto been proposed. Known are for example methods of deriving prime numbers by executing a modular calculation having its basis in the finite region expressed by GF ($2^n$) as Galois field through determination of two prime numbers by RSA method or through use of error correction parameters on modular operations by Montgomery method, and by executing a modular calculation by modular reduction in accordance with Montgomery method (see Japanese Patent Nos. 2,722,411, 2,722,412, 2,722,413, and France Patent No. 2,679,054).

Without exceptions, however, the conventional methods have derived prime numbers through extremely complex processing and processes, requiring an elongated processing time for the derivation, and have failed to achieve simple derivation of prime numbers of arbitrary ranks.

SUMMARY OF THE INVENTION

It is therefore the object of the present invention to derive prime numbers through effective processing and steps on the basis of a high degree of theory, to thereby remarkably reduce the processing time required for the derivation and to enable prime numbers of arbitrary ranks to be derived in a simple manner.

BRIEF DESCRIPTION OF THE DRAWINGS

FIG. 3 illustrates by way of example a program for executing the method of deriving prime numbers of the present invention;

FIG. 5 is a diagram showing the result of processing of the program of FIG. 3.

DESCRIPTION OF THE PREFERRED EMBODIMENTS

A method of deriving prime numbers in accordance with the present invention comprises the following steps:

(1) a step of adding numerical values in sequence to a prime number of the anterior rank to calculate prime number candidates of the next rank;

(2) a step of dividing the thus calculated prime number candidate by known prime numbers to verify whether it is a prime number or not; and (3) a step of executing processing for reducing the verification time when the thus calculated prime number candidate is larger than a certain value.

Figure 1:
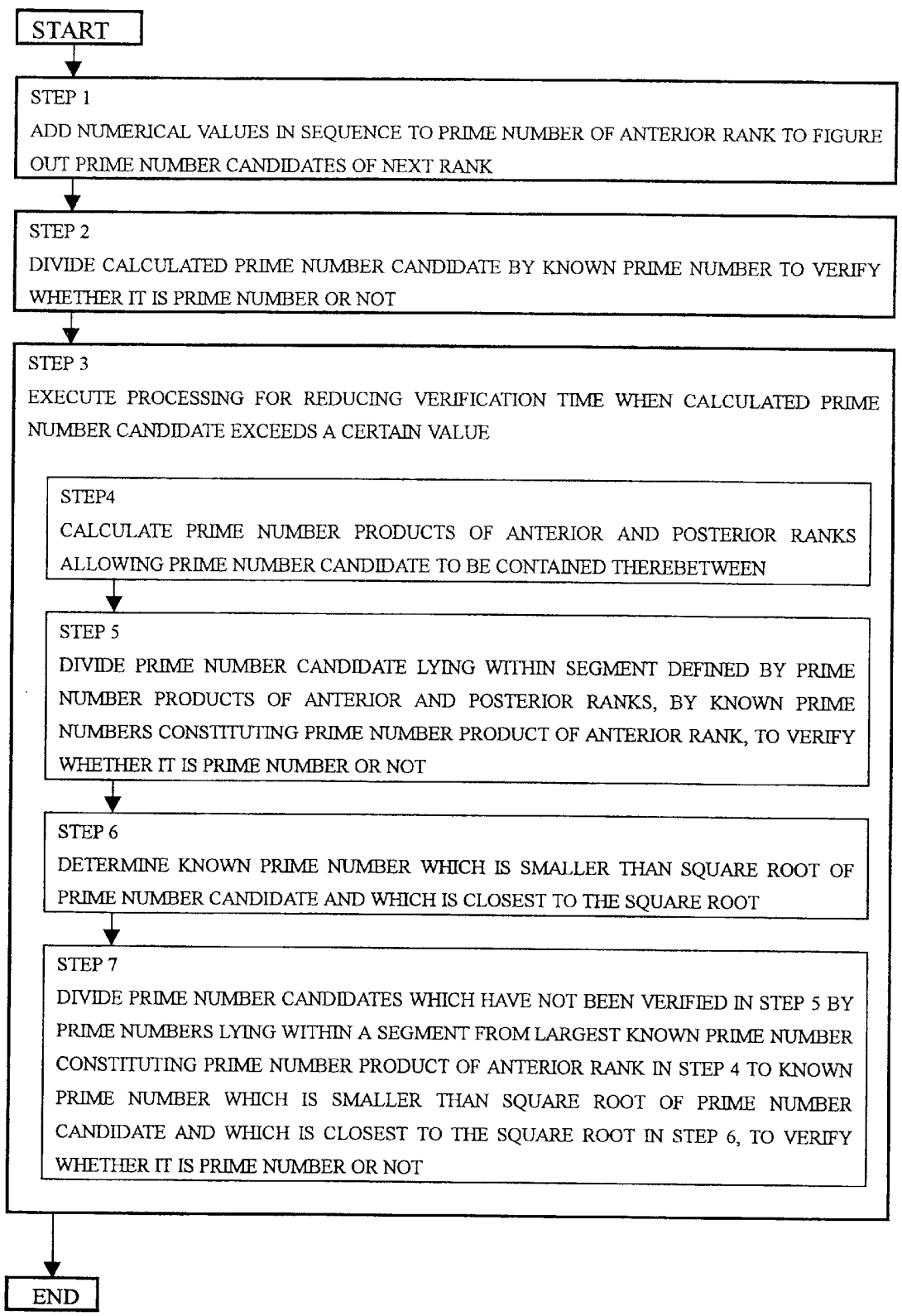
FIG. 1 is a flowchart showing processing steps of a method of deriving prime numbers in accordance with the present invention.

The above processing steps of the present method are schematically shown in FIG. 1.

In the first step, the prime number candidate of the next rank is figured out from the prime number of the anterior rank. The calculation of the prime number candidates is carried out using the following recursion formula. As used herein, $A_N$ (I) is a prime number candidate of the $I^{th}$ rank, A (I) is a prime number of the $I^{th}$ rank, and J is a positive integer.

$$A_N(I)=A(I-1)+2\times J \qquad (1)$$

$$J=\{1, 2, 3, \ldots, (A(I-1)-1)/2\} \qquad (2)$$

Since the prime number is a positive integer having no divisors except 1 and itself, prime numbers larger than the second ranked prime number A (2)=3 result inevitably in odd numbers, with the exception of the first ranked prime number A (1)=2. The $I^{th}$ ranked prime number A (I) is larger than the $(I-1)^{th}$ ranked prime number A (I−1) and smaller than double the $(I-1)^{th}$ ranked prime number A (I−1).

Thus, the $I^{th}$ ranked prime number A (I) lies within the set of the $I^{th}$ ranked prime number candidates $A_N$ (I), which are obtained by adding (A (I−1)−1)/2 even numbers to the $(I-1)^{th}$ ranked prime number A (I−1).

In the second step, verification is made of whether the above prime number candidate is a prime number or not using the known prime numbers. Let A (L) be a known prime number, if a value obtained by dividing a prime number candidate $A_N$ (I) by the known prime number A (L), $$A_N(I)/A(L)$$

$$L=2,3, \ldots, I-1$$

is not an integer, then it can be verified that the prime number candidate is a prime number, but if the value is an integer, then it can be verified that it is not a prime number.

This means that since the prime number candidates $A_N$ (I) are already odd numbers, the verification of whether it is a prime number or not can be achieved by division by all the prime numbers of higher ranks than the anterior rank, that is, the second, third, . . . , $(I-1)^{th}$ ranks.

In the third step, the processing for reducing the verification time is carried out if the above prime number candidates are larger than a certain value. The third step includes the following steps:

(4) a step of calculating the prime number products of the anterior and posterior ranks allowing a prime number candidate to be contained therebetween;

(5) a step of verifying whether it is a prime number or not by dividing a prime number candidate lying between the prime number products of the anterior and posterior ranks, by a known prime number constituting the prime number product of the anterior rank;

(6) a step of determining a known prime number which is smaller than the square root of a prime number candidate and is most approximate to that square root; and (7) a step of verifying whether a prime number candidate which has not been verified to be a prime number in step (5) is a prime number or not, by dividing it by a prime number lying within the segment from the largest known prime number constituting the prime number product of the anterior rank in step (4) to the known prime number which is smaller than the square root of the prime number candidate in step (6) and is most approximate to that square root.

In the fourth step, calculation is made of the prime number products of the anterior and posterior ranks allowing a prime number candidate to be contained therebetween. Herein, the prime number product X (K) is obtained by multiplying in sequence from the first ranked prime number A(1) to the $K^{th}$ ranked prime number A(K) and is expressed as $$X(K)=A(1)A(2)\ldots A(K-1)A(K)$$

In order to figure out the prime number products of the anterior and posterior ranks allowing a prime number candidate to be contained therebetween, the following inequality is used.

$$X(K-1)<A_N(I)<X(K)$$

where $A_N$ (I) is the $I^{th}$ ranked prime number candidate, D=X (K−1) is the prime number product of the anterior rank, C=X (K) is the prime number product of the posterior rank, and K is a positive integer defined in a manner corresponding to $A_N$ (I).

In the fifth step, verification is made of whether a prime number candidate is a prime number or not, by dividing the prime number candidate by a known prime number constituting the anteriorly ranked prime number product.

First, for the prime number candidate $A_N$ (I) defined by the above inequality, $$R=A_N(I)-D \qquad (3)$$

$$D=X(K-1)$$

is figured out.

In this case, it is impossible when R=1 to judge whether the prime number candidate $A_N$ (I) is a prime number or not. The reason is that when R=1 there results $$A_N(I)=A(1)A(2)\ldots A(K-1)+1$$

which is insufficient for the judgment of whether it is a prime number or not, requiring rejudgment of the prime property.

In the case of X (5) for example, there results $$X(5)=2\times 3\times 5\times 7\times 11+1=2311$$

so that it is judged to be a prime number. But, with X (6)

$$X(6)=2\times 3\times 5\times 7\times 11\times 13+1=30031$$

which includes a factor configuration (59×509), requiring reverification when R=1.

When R≦A (K−1), R has factors of even numbers or not more than (K−1), so that $A_N$ (I)=D+R is not a prime number because D and R have the same factor(s)

On the contrary, when R>A (K−1), R is divided by a known prime number equal to or less than A (K−1) to obtain the following remainder.

$$R/A(T)=m+r \qquad (4)$$

$$T=1, 2, \ldots, K-1$$

m; positive integer
r; positive integer satisfying 0≦r≦A (T)

Herein, if all of R/A (T) are integers (r=0), it is judged not to be a prime number in the similar meaning to the case of R≦A (K−1).

If R/A (T) is not an integer, that is, if not r=0, then reverification is needed.

In the sixth step, a known prime number is determined which is smaller than the square root of a prime number candidate and which is most approximate to that square root. To determine such a prime number A (U), the following inequality is used, where U is a positive integer.

$$(A_N(I))^{1/2}>A(U)$$

$$U=2, 3, \ldots, N-1$$

This means that if a certain prime number candidate $A_N$ (I) is not a prime number, it has two or more prime factors. In other words, $A_N$ (I) is given as $A_N$ (I)=(a×b), the product of arbitrary two numbers (a, b). Then, the two numbers (a, b) at that time are equal to each other or different from each other, that is, one is larger than the other. It is thus possible to judge whether it is a prime number or not by dividing it by a known prime number less than the square root of $A_N$ (I). This is the reason why determination is made of a known prime number A (U) which is smaller than the square root of a prime number candidate and which is most approximate to that square root, to thereby find the value of U.

In the seventh step, verification is made of whether a prime number candidate which has not been verified to be a prime number in the fifth step is a prime number or not, by dividing it by a prime number lying within the segment from the largest known prime number constituting the prime number product of the anterior rank to the prime number which is smaller than the square root of the prime number candidate and is most approximate to that square root.

A prime number candidate $A_N$ (I) which has not been verified to be a prime number in the fifth step is subjected to calculation given as $$A_N(I)/A(L) \qquad (5)$$

$$L=K,K+1,\ldots, U$$

If the resultant value is an integer then it is judged not to be a prime number, whereas if not an integer then it is judged to be a prime number.

The present invention also provides an apparatus for deriving prime numbers, appropriate for the execution of the above method.

The apparatus comprises, at least, entry means for entering data, storage means for storing arbitrary prime number products entered through the entry means, and processing means for processing the data entered. With respect to a prime number rank entered through the entry means, the processing means derive prime numbers till the entered rank is reached, by way of a step (first step) of sequentially adding numerical values to a prime number of the anterior rank to calculate a prime number candidate of the next rank, a step (second step) of dividing the thus calculated prime number candidate by known prime numbers to verify whether it is a prime number or not, and a step (third step) of executing processing for reducing the verification time when the thus calculated prime number candidate is larger than a certain value. Then the processing means store the thus derived prime numbers in the storage means. The data stored in the storage means can be fed to output means at any time.

In a computer processing unit provided with the processing means, the storage means and the data entry and output means, prime number deriving processing can be executed by use of a computer readable record medium having a program on which is recorded the processing steps of the prime number deriving method set forth hereinabove.

The method of deriving prime numbers of the present invention will now be described more specifically with reference to FIGS. 2 to 5.

Figure 2:
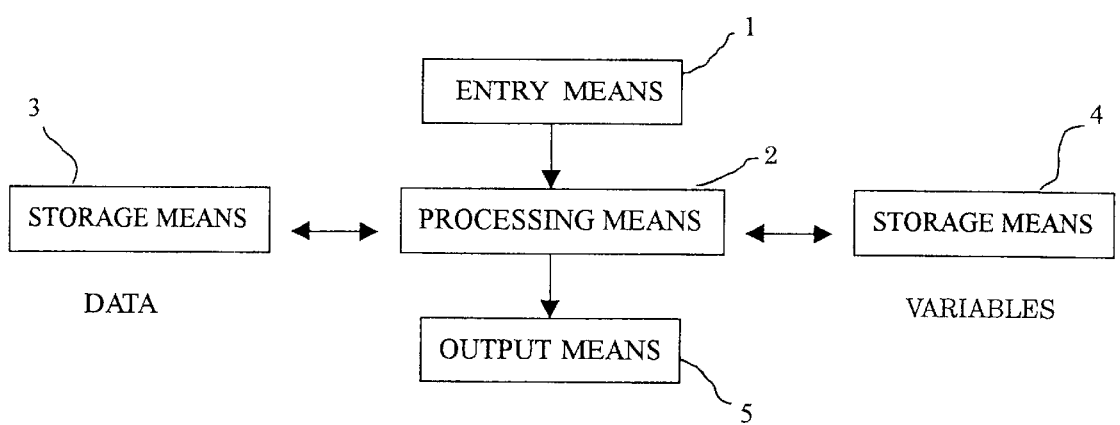
FIG. 2 is a diagram showing an example of the hardware configuration of an apparatus for executing the method of deriving prime numbers of the present invention.

The hardware configuration of a system for executing the prime number deriving method of the present invention comprises, as shown in FIG. 2 by way of example, entry means 1, processing means 2 for executing various arithmetic processing, storage means 3 for storing data, storage means 4 for storing variable values, and output means 5.

In the case of the computer processing unit, the processing means 2 correspond to a programmed main control unit (CPU), to which are connected pointing devices such as a keyboard and a mouse acting as the entry means 1, internal memories (RAM, ROM), a hard disk and a flexible disk acting as the storage means 3 and 4, and a display or a printer acting as the output means 5. In the computer processing unit, the processing steps of the prime number deriving method of the present invention are stored on a program, which in turn is read by the storage means 3 and 4 for processing.

In a mode in which the above means are incorporated into a specific apparatus, they may be connected to one another by way of a data bus. The hardware configuration is not intended to be limited to the example shown.

The $1^{st}$ ranked prime number A (1) to the $M^{th}$ ranked prime number A (M) are stored in advance in the storage means 3. Note that M is an appropriate integer larger than 2. The reason is that the above recursion formula (1) cannot be applied to the prime number of the $2^{nd}$ rank or higher, that is, to $I \leq 2$.

In a program shown in FIG. 3, as described in line No. 140, the $1^{st}$ ranked prime number A (1)=2 to the $46^{th}$ prime number A (46)=199 are entered in advance as known prime number data.

The initial values of the prime number products D and C of the anterior and posterior ranks, and the initial value of K are also stored in the storage means 3. Herein, $D \geq X$ (1)=2, $C \geq X$ (2)=2×3=6.

In the program shown in FIG. 3, as described in line No. 110, D=X (3)=2×3×5=30, C=X (4)=2×3×5×7=210, and K=3 are entered as the initial value data.

In order to execute the prime number deriving method of the present invention, the system is first activated and, when there appears "A (N)=" on the display acting as the output means, the rank N of a prime number to be derived is entered through the entry means 1 in the form of the keyboard. The thus entered rank N is stored via the processing means 2 into an N storage file of the storage means 4.

In the program shown in FIG. 3, description is hereinafter made of the case by way of example where the $60^{th}$ ranked prime number is derived, that is, where 60 is entered as N.

When entering the deriving rank N, as described in line Nos. 120 to 170, the processing means 2 read known prime number data in sequence from the storage means 3, which are written to A (1) to A (46) and stored in the A (I) storage file of the storage means 4, allowing the ranks and corresponding prime numbers to appear as "1 2, 2 3, . . . 46 199" in sequence on the display.

Then, as described in line Nos. 290 to 310, the first step for calculating prime number candidates is carried out.

The processing means 2 read the $46^{th}$ ranked prime number A (46)=199 from the A (I) storage file of the storage means 4 and first execute a calculation using the expression (2)

$$(A(I-1)-1)/2$$

to obtain 99. Thus, $$J=\{1,2,3,\ldots,99\}$$

hence, there exist 99 prime number candidates $A_N$ (47).

Then, the recursion formula (1) is used to figure out the first prime number candidate $A_1$ (47) as follows.

$$A_1(47)=A(46)+2\times1=199+2=201$$

Then, as described in line No. 320, the processing means 2 read from the storage means 3 the initial value of the prime number product C of the posterior rank, that is, C=210, which in turn is compared in magnitude with $A_1$ (47)=201.

As to the first prime number candidate $A_1$ (47) there results $A_1$ (47)<C, so that the fifth step is carried out, whereas as to the prime number candidate $A_N$ (47) posterior to the sixth prime number candidate $A_6$ (47)=211 there is established $A_N$ (47)>C, allowing the execution of the fourth step for calculating the prime number products D and C of the anterior and posterior ranks which contain a prime number candidate therebetween.

The fourth step is carried out, by the processing means 2, as described in line Nos. 210 to 260.

The processing means 2 read from the storage means 3 the initial value of K, that is, K=3, and adds 1 thereto, which is newly stored in a K storage file of the storage means 4.

Then, as described in line Nos. 230 to 250, the prime number products X (K) are calculated in sequence as follows.

$$X(2)=X(1)\times A(2)=A(1)\times A(2)=2\times3=6$$

$$X(3)=X(2)\times A(3)=6\times5=30$$

$$X(4)=X(3)\times A(4)=30\times7=210$$

The above processing is repeated and the prime number product X (5) is figured out as follows.

$$X(5)=X(4)\times A(5)=210\times11=2310$$

Then, the prime number product X (4) of the anterior rank is newly set as D, with the prime number product X (5) of the posterior rank being set as C, which are stored respectively into the D storage file and the C storage file of the storage means 4.

The fifth step is carried out, by the processing means 2, as described in line Nos. 330 to 370.

The processing means 2 first executes a calculation using the expression (3) as follows.

$$R=A_1(47)-D=201-30=171$$

The processing means 2 then judge the magnitude of R and A (K−1). In this case, A (K−1)=A (3−1)=A (2)=3, hence R>A (K−1).

Then, calculation is executed in sequence using the expression (4) as follows.

$$R/A(1)=171/2=m+r=170+1$$

$$R/A(2)=171/3=m=57(r=0)$$

If T=2, then r=0 and R/A (2) results in an integer. Hence, it is judged that $A_1$ (47) is not a prime number.

Then, the procedure goes back to the first step in which the recursion formula (1) is used to figure out the second prime number candidate $A_2$ (47) as follows.

$$A_2(47)=A(46)+2\times 2=199+4=203$$

Then, in the same manner as the above, the processing means 2 judge the magnitude of the posteriorly ranked prime number product C=210 and of $A_2$ (47)=203. The result is $A_2$ (47)<C, allowing the execution of the fifth step.

In the fifth step, the processing means 2 execute a calculation using the expression (3) as $$R=A_2(47)-D=203-30=173$$

to judge the magnitude of R and A (K−1). In this case as well, A (K−1)=3, and hence R>A (K−1).

Calculations are then made using the recursion formula (4) as $$R/A(1)=173/2=m+r=172+1$$

$$R/A(2)=173/3=m+r=171+2$$

whereupon r=0 is not obtained and the result of division does not become an integer, so that the sixth step is carried out.

The sixth step is performed by the processing means 2 as described in line Nos. 500 to 530.

The processing means 2 first figure out the square root of $A_2$ (47) as $$(A_2(47))^{1/2}=(203)^{1/2}=14.2$$

to judge the magnitude relative to A (U) in sequence.

$$(A_2(47))^{1/2}=14.2>A(2)=3$$

$$(A_2(47))^{1/2}=14.2>A(3)=5$$

$$(A_2(47))^{1/2}=14.2>A(4)=7$$

$$(A_2(47))^{1/2}=14.2>A(5)=11$$

$$(A_2(47))^{1/2}=14.2>A(6)=13$$

$$(A_2(47))^{1/2}=14.2<A(7)=17$$

Then, U=7, at which $(A_2(47))^{1/2}<A(U)$ has first resulted, is stored in a U storage file of the storage means 4, allowing the execution of the seventh step.

The seventh step is carried out, by the processing means 2, as described in line Nos. 540 to 590.

The processing means 2 first read U=7 from the U storage file of the storage means 4 and add 1 thereto to obtain Z. Thus, Z=7+1=8.

Then, calculations are made in sequence using the expression (5) until L reaches Z=8, starting from K=3.

$$A_2(47)/A(3)=203/5=40.6$$

$$A_2(47)/A(4)=203/7=29$$

When L=4, an integer is obtained, whereupon it is judged that $A_2$ (47) is not a prime number.

Hereinbelow, as the third prime number candidates $A_3$ (47), the fourth prime number candidates $A_4$ (47), etc., the steps are executed in an appropriate manner to verify whether each one is a prime number or not.

Thus, when the prime number A (47) of the $47^{th}$ rank is defined, prime number candidates $A_N$ (48) of the $48^{th}$ rank are verified through appropriate execution of the steps so that the $48^{th}$ ranked prime number A (48) is defined.

The processing means 2 iteratively execute the steps in an appropriate manner, to derive the $47^{th}$ ranked prime number A (47) to the $60^{th}$ ranked prime number A (60), which in turn are stored in the storage means 3 and 4 as needed. Simultaneously, the processing means 2 update the above variables and provide in sequence the ranks and corresponding prime numbers, in the form of, e.g., "47 211, . . . , 60 281", as its output to the display, i.e., the output means 5.

Figure 4:
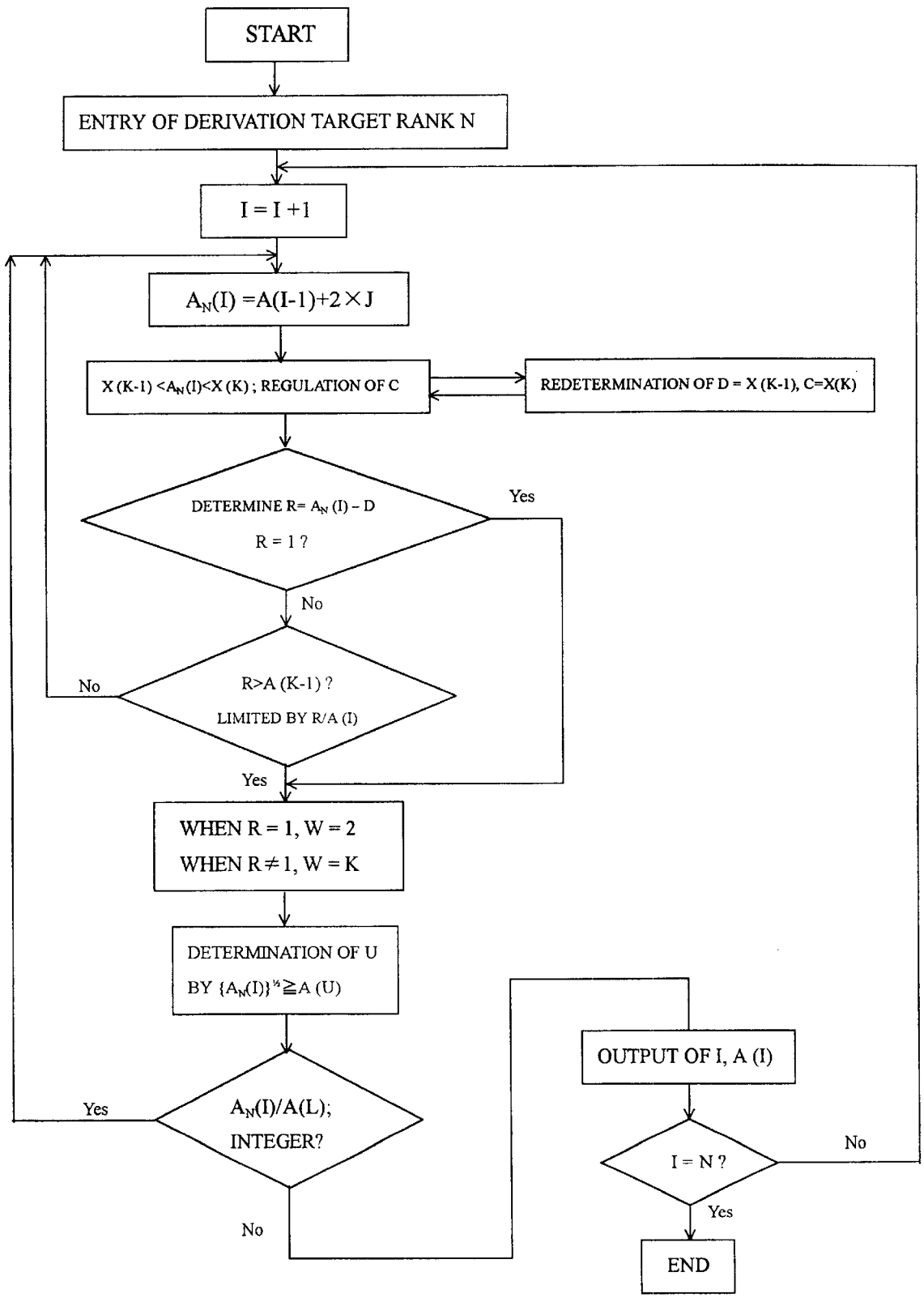
FIG. 4 is a flowchart showing processing of the program of FIG. 3.

A flowchart illustrating the processing of the above program is shown in FIG. 4, and the result of processing appearing on the display through the execution of the program is shown in FIG. 5.

What is claimed is:

1. A method of deriving prime numbers for use in ciphers or message authentication, comprising:

a first step of adding, with respect to a prime number rank entered through an entry means, numerical values to a prime number of the anterior rank in sequence to calculate prime number candidates of the next rank;

a second step of dividing said thus calculated prime number candidate by known prime numbers to verify whether it is a prime number or not; and a third step of executing processing for reducing the verification time when said thus calculated prime number candidate is larger than a certain value;

whereby prime numbers are derived until said entered rank is reached and said prime number is applied to a use in ciphers or message authentication.

2. A method of deriving prime numbers according to claim 1, wherein said first step includes calculating said prime number candidates using a recursion formula $$A_N(I)=A(I-1)+2\times J$$

$$J=\{1,2,3,\ldots,(A(I-1)-1)/2\}$$

where $A_N$ (I); $I^{th}$ ranked prime number candidate,

A (I); $I^{th}$ ranked prime number, and

J; positive integer.

3. A method of deriving prime numbers according to claim 2, wherein said second step includes verifying whether said prime number candidate is a prime number or not, by judging that it is a prime number if the result of division $$A_N(I)/A(L)$$

$$L=2,3,\ldots,I-1$$

where $A_N$ (I); $I^{th}$ ranked prime number candidate, and A (L); $L^{th}$ ranked prime number, is not an integer, or by judging that it is not a prime number if said result of division is an integer.

4. A method of deriving prime numbers according to claim 1, wherein said second step includes verifying whether said prime number candidate is a prime number or not, by judging that it is a prime number if the result of division $$A_N(I)/A(L)$$

$$L=2,3,\ldots,I-1$$

where $A_N$ (I); $I^{th}$ ranked prime number candidate, and A (L); $L^{th}$ ranked prime number, is not an integer, or by judging that it is not a prime number if said result of division is an integer.

5. A method of deriving prime numbers according to claim 1, wherein
said third step comprises:
a fourth step of calculating the prime number products of the anterior and posterior ranks allowing a prime number candidate to be contained therebetween;
a fifth step of verifying whether it is a prime number or not by dividing a prime number candidate lying between the prime number products of the anterior and posterior ranks, by a known prime number constituting the prime number product of the anterior rank;
a sixth step of determining a known prime number which is smaller than the square root of a prime number candidate and is most approximate to that square root; and
a seventh step of verifying whether a prime number candidate which has not been verified to be a prime number in said fifth step is a prime number or not, by dividing it by a prime number lying within the segment from the largest known prime number constituting the prime number product of the anterior rank, calculated in the fourth step, to the known prime number which is smaller than the square root of the prime number candidate and is most approximate to that square root, calculated in the sixth step.

6. A method of deriving prime numbers according to claim 5, wherein
said fourth step includes calculating said prime number products of the anterior and posterior ranks allowing a prime number candidate to be contained therebetween, by using an inequality $$X(K-1) < A_N(I) < X(K)$$

where $A_N(I)$; $I^{th}$ ranked prime number candidate,
X (K−1); anteriorly ranked prime number product,
X (K); posteriorly ranked prime number product, and
K; positive integer.

7. A method of deriving prime numbers according to claim 6, wherein said fifth step includes first calculating, for a prime number candidate $A_N$ (I), $$R = A_N(I) - D$$

$$D = X(K-I)$$

where $A_N$ (I); Ith ranked prime number candidate,
X (K−1); anteriorly ranked prime number product, and
K; positive integer,
said prime number candidate $A_N$ (I) resulting in R=1 being reverified by known prime numbers;
said prime number candidate $A_N$ (I) resulting in R<A (K−1) being judged not to be a prime number, and
said prime number candidate $A_N$ (I) resulting in R>A (K−1) being subjected to a calculation $$R/A(T)$$

$$T = 1, 2, \ldots, K-1$$

where A (T); $T^{th}$ ranked prime number,
and, if the resultant value is an integer, being judged not to be a prime number, but, if not an integer, being reverified by known prime numbers anterior to A (K).

8. A method of deriving prime numbers according to claim 5, wherein
said fifth step includes first calculating, for a prime number candidate $A_N$ (I)

$$R = A_N(I) - D$$

$$D = X(K-I)$$

where $A_N$ (I); $I^{th}$ ranked prime number candidate,
X (K−1); anteriorly ranked prime number product, and
K; positive integer, said prime number candidate $A_N$ (I) resulting in R=1 being reverified by known prime numbers;
said prime number candidate $A_N$ (I) resulting in R<A (K−1) being judged not to be a prime number, and
said prime number candidate $A_N$ (I) resulting in R>A (K−1) being subjected to a calculation $$R/A(T)$$

$$T = 1, 2, \ldots, K-1$$

where A (T); $T^{th}$ ranked prime number,
and, if the resultant value is an integer, being judged not to be a prime number, but, if not an integer, being reverified by known prime numbers anterior to A (K).

9. A method of deriving prime numbers according to claim 8, wherein said sixth step includes using an inequality $$(A_N(I)))^{1/2} > A(U)$$

$$U = 2, 3, \ldots, N-1$$

where $A_N(I)$; $I^{th}$ ranked prime number candidate,
A (U); $U^{th}$ ranked prime number, and
U; positive number,
to select a known prime number which is smaller than a square root of said prime number candidate and which is closest to said square.

10. A method of deriving prime numbers according to claim 5, wherein
said sixth step includes using an inequality $$(A_N(I)^{1/2} > A(U)$$

$$U = 2, 3, \ldots, N-1$$

where $A_N$ (I); $I^{th}$ ranked prime number candidate,
A (U); $U^{th}$ ranked prime number, and
U; positive number,
to select a known prime number which is smaller than a square root of said prime number candidate and which is closest to said square.

11. A method of deriving prime numbers according to claim 5, wherein
said seventh step includes subjecting a prime number candidate $A_N$ (I) which has not been verified to be a prime number in said fifth step to a calculation $$A_N(I)/A(L)$$

$$L = K, K+1, \ldots, U$$

where $A_N$ (I); $I^{th}$ ranked prime number candidate,
A (L); $L^{th}$ ranked prime number,
K; rank of largest known prime number constituting anteriorly ranked prime number product, and
U; rank of known prime number which is smaller than square root of the prime number candidate and which is closest to the square root, to judge, if the resultant value is an integer, that it is not a prime number, but to judge, if not an integer, that it is a prime number.

12. An apparatus for deriving prime numbers comprising:

entry means for entering data, storage means for storing arbitrary prime number products entered through said entry means, a recording medium for recording a program operative to control a processor to derive a prime number, and processing means for processing said entered data and executing said program, wherein said program stored on said recording medium and executable by said processing means comprises:

a first step of adding, with respect to a prime number rank entered through said entry means, numerical values to a prime number of the anterior rank in sequence to calculate prime number candidates of the next rank;

a second step of dividing said thus calculated prime number candidate by known prime numbers to verify whether it is a prime number or not; and a third step of executing processing for reducing the verification time when said thus calculated prime number candidate is larger than a certain value; and said processing means is operative to derive prime numbers until said entered rank is reached, and said processing means is operative to store the results in said storage means.

13. The apparatus of claim 12, wherein said first step includes calculating said prime number candidates using a recursion formula $$A_N(I)=A(I-1)+2XJ$$

$$J=\{1,2,3, \ldots, (A(I-1)-1)/2\}$$

where $A_N$ (I); $I^{th}$ ranked prime number candidate,
A (I); $I^{th}$ ranked prime number, and
J; positive integer.

14. The apparatus of claim 12, wherein said second step includes verifying whether said prime number candidate is a prime number or not, by judging that it is a prime number if the result of division $$A_N(I)/A(L)$$

$$L=2,3, \ldots, I-1$$

where $A_N$ (I); $I^{th}$ ranked prime number candidate, and
A (L); $L^{th}$ ranked prime number, is not an integer, or by judging that it is not a prime number if said result of division is an integer.

15. The apparatus of claim 12, wherein said third step comprises:

a fourth step of calculating the prime number products of the anterior and posterior ranks allowing a prime number candidate to be contained therebetween;

a fifth step of verifying whether it is a prime number or not by dividing a prime number candidate lying between the prime number products of the anterior and posterior ranks, by a known prime number constituting the prime number product of the anterior rank;

a sixth step of determining a known prime number which is smaller than the square root of a prime number candidate and is most approximate to that square root; and a seventh step of verifying whether a prime number candidate which has not been verified to be a prime number in said fifth step is a prime number or not, by dividing it by a prime number lying within the segment from the largest known prime number constituting the prime number product of the anterior rank, calculated in the fourth step, to the known prime number which is smaller than the square root of the prime number candidate and is most approximate to that square root, calculated in the sixth step.

16. A computer readable record medium having thereon recorded a program for allowing a computer to execute a method of deriving prime numbers, said program comprising a first step of adding, with respect to a prime number rank entered through an entry means, numerical values to a prime number of the anterior rank in sequence to calculate prime number candidates of the next rank;

a second step of dividing said thus calculated prime number candidate by known prime numbers to verify whether it is a prime number or not;

a third step of executing processing for reducing the verification time when said thus calculated prime number candidate is larger than a certain value; and a repetition of the deriving of prime numbers until said entered rank is reached.

17. The computer readable record medium of claim 16 wherein said first step includes calculating said prime number candidates using a recursion formula $$A_N(I)=A(I-1)+2XJ$$

$$J=\{1,2,3, \ldots, (A(I-1)-1)/2\}$$

where $A_N$ (I); $I^{th}$ ranked prime number candidate,
A (I); $I^{th}$ ranked prime number, and
J; positive integer.

18. The computer readable record medium of claim 16 wherein said second step includes verifying whether said prime number candidate is a prime number or not, by judging that it is a prime number if the result of division $$A_N(I)/A(L)$$

$$L=2,3, \ldots, I-1$$

where $A_N$ (I); $I^{th}$ ranked prime number candidate, and
A (L); $L^{th}$ ranked prime number, is not an integer, or by judging that it is not a prime number if said result of division is an integer.

19. The computer readable record medium of claim 16 wherein said third step comprises:

a fourth step of calculating the prime number products of the anterior and posterior ranks allowing a prime number candidate to be contained therebetween;

a fifth step of verifying whether it is a prime number or not by dividing a prime number candidate lying between the prime number products of the anterior and posterior ranks, by a known prime number constituting the prime number product of the anterior rank;

a sixth step of determining a known prime number which is smaller than the square root of a prime number candidate and is most approximate to that square root; and a seventh step of verifying whether a prime number candidate which has not been verified to be a prime number in said fifth step is a prime number or not, by dividing it by a prime number lying within the segment from the largest known prime number constituting the prime number product of the anterior rank, calculated in the fourth step, to the known prime number which is smaller than the square root of the prime number candidate and is most approximate to that square root, calculated in the sixth step.

* * * * *